United States Patent
Pawar et al.

(10) Patent No.: US 8,570,967 B1
(45) Date of Patent: *Oct. 29, 2013

(54) FORMING MULTI-USER PACKET BASED GROUPS USING RESPONSE BEHAVIOR

(75) Inventors: Hemanth Balaji Pawar, Herndon, VA (US); Shilpa Srinivas Kowdley, Herndon, VA (US); Bhagwan Singh Khanka, Lenexa, KS (US); Anoop Kumar Goyal, Overland Park, KS (US); John William Prock, Peculiar, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 114 days.

This patent is subject to a terminal disclaimer.

(21) Appl. No.: 13/243,079

(22) Filed: Sep. 23, 2011

Related U.S. Application Data

(63) Continuation of application No. 12/265,338, filed on Nov. 5, 2008, now Pat. No. 8,051,200.

(51) Int. Cl.
G08C 25/02 (2006.01)
H04W 72/00 (2009.01)
H04W 4/00 (2009.01)

(52) U.S. Cl.
USPC ........... 370/329; 370/252; 370/312; 370/338; 455/452.2; 714/748

(58) Field of Classification Search
USPC ................. 370/252, 312, 328, 329, 338, 349; 455/450, 452.1, 452.2; 714/746, 748
See application file for complete search history.

(56) References Cited

U.S. PATENT DOCUMENTS

| | | | | |
|---|---|---|---|---|
| 7,146,426 | B2* | 12/2006 | Hashimoto | 709/237 |
| 7,702,339 | B2* | 4/2010 | Moon et al. | 455/463 |
| 7,702,344 | B2* | 4/2010 | Moon et al. | 455/503 |
| 2007/0070880 | A1* | 3/2007 | Cai et al. | 370/208 |
| 2008/0219194 | A1* | 9/2008 | Kim et al. | 370/310 |
| 2013/0022020 | A1* | 1/2013 | Novak et al. | 370/330 |

* cited by examiner

*Primary Examiner* — Chi Pham
*Assistant Examiner* — Ahmed Elallam

(57) ABSTRACT

A plurality of candidate access terminals for participation in a multi-user packet-based (MUP-based) communication is determined. Two or more candidate access terminals are grouped into a MUP-based group, the grouping based on a hybrid automatic repeat request behavior of the plurality of candidate access terminals. Data is sent to the MUP-based group using a multi-user packet.

20 Claims, 8 Drawing Sheets

FORMING MULTI-USER PACKET BASED GROUPS USING RESPONSE BEHAVIOR

CROSS-REFERENCE TO RELATED APPLICATIONS

This application is a continuation of U.S. application Ser. No. 12/265,338, filed Nov. 5, 2008, entitled "FORMING MULTI-USER PACKET BASED GROUPS USING RESPONSE BEHAVIOR," the entire disclosure of which is hereby incorporated by reference.

SUMMARY

Embodiments of the invention are defined by the claims below, not this summary. A high-level overview of various aspects of the invention is provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

Some embodiments of the present invention relate to sending data to access terminals selected to participate in a multi-user packet (MUP) based communication. In an embodiment, a plurality of candidate access terminals that might be included in a MUP-based group is determined. A number of a type of HARQ response for each of the terminals is counted for a period of time. A measure of HARQ response types is calculated for each of the terminals based on the number of the type of HARQ response for that terminal. Prior to grouping terminals from the plurality of terminals to form a MUP-based group, the measure for each of the terminals is compared to a HARQ threshold. Two or more terminals from the plurality of terminals are grouped to form a MUP-based group, where each terminal in the MUP-based group has a measure greater than the HARQ threshold. Data is sent to the MUP-based group using a MUP.

Another embodiment includes determining a plurality of candidate access terminals that might be included in MUP-based communication. For each of the terminals, a history of HARQ responses is collected. A determination is made that a predetermined amount of history of HARQ responses has been collected. Two or more terminals from the plurality of terminals are grouped to form a MUP-based group, where each of the terminals is grouped based on a measure of HARQ response types in the history of HARQ responses collected for that terminal. Data is sent to the MUP-based group using a MUP.

In another embodiment, a plurality of candidate access terminals is determined that might be included in MUP-based communication. For each of the terminals, a history of HARQ responses is collected. A determination is made that a predetermined amount of history of HARQ responses has been collected. Two or more terminals from the plurality of terminals are grouped to form a MUP-based group, where each of the terminals is grouped based on a measure of HARQ response types in the history of HARQ responses collected for that terminal. A first portion of a data flow is sent to the MUP-based group using one or more MUPs. New HARQ responses are received from the MUP-based group. The terminals in the MUP-based group are regrouped based on the new HARQ responses, resulting in a new group. A second portion of the data flow is sent to the new group using one or more MUPs.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
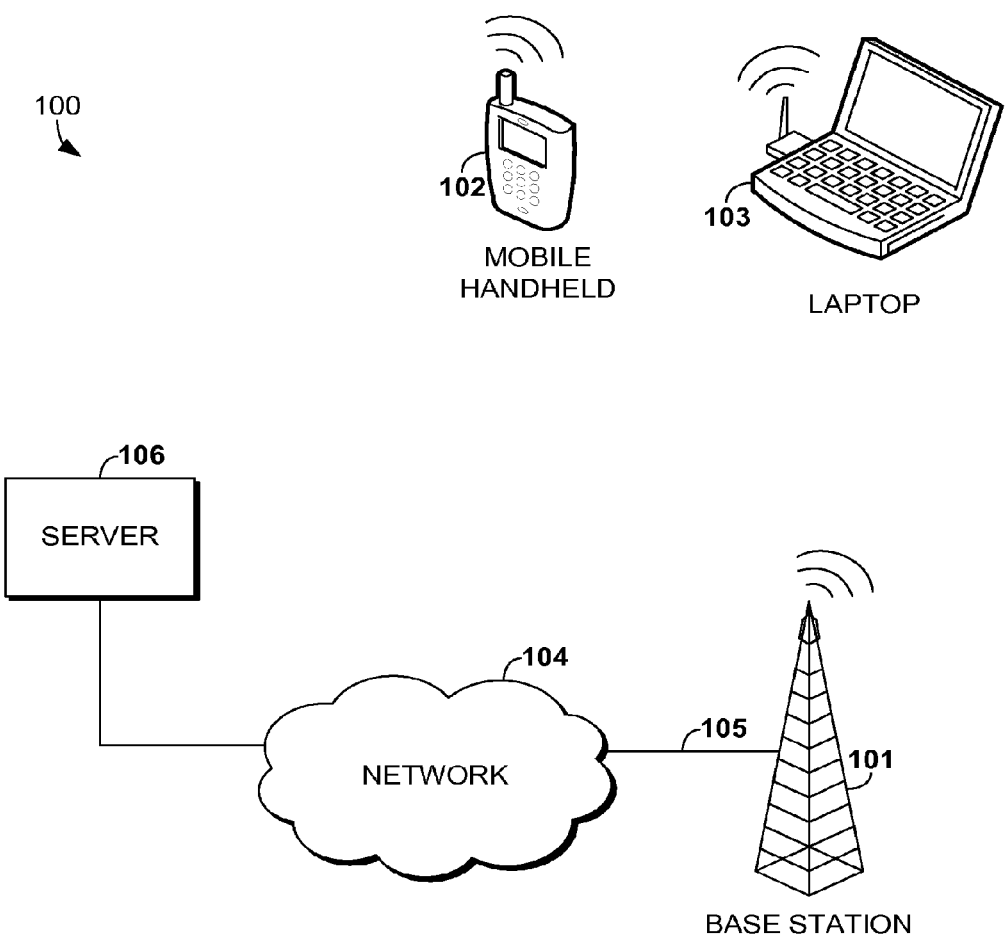
FIG. 1 depicts a block diagram of an exemplary computing environment suitable for use in implementing an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to a method of communicating over a wireless channel using multi-user packets (MUPs). The MUPs are used to increase the efficiency of use of the wireless channel.

In accordance with some embodiments of the present invention, mobile communication devices communicate via a wireless link through a base station that is coupled to a wired network. The wireless link can be resource limited (e.g., in terms of bandwidth or amount of data that can be sent over a period of time). Access terminals are mobile communications devices that use a wireless link. These terminals can be categorized based on a number of features, including the format of packets to be communicated, the data rate at which data is communicated, and the specific data to be received. Multiple access terminals requesting the same data, at the same time, in the same format, at the same data rate could cause multiple copies of substantially the same packet to be transmitted over the wireless link. Each copy will reach each access terminal due to the shared nature of the wireless link; therefore, each redundant copy of the packet contributes to wasting channel resources.

A method to alleviate the waste of channel resources due to the transmission of the same information in the same way to multiple access terminals is to use a multi-user packet (MUP), which is a single packet that serves the data to all of the interested access terminals. A single-user packet (SUP) is a packet that servers data to a single access terminal. However, the amount of benefit from the use of MUPs depends on the probability that each access terminal being served by the MUP, which make up MUP-based group, will successfully receive the packet. If even a single member of the MUP-based group fails to receive the MUP, then the MUP must be retransmitted and each of the members must receive the new transmission, even if that member had successfully received a previous transmission of the MUP.

An embodiment of the invention is directed to a computer-readable media storing computer-executable instructions for performing a method of selecting two or more access terminals to participate in MUP-based communication. The method includes determining a number of candidate access terminals for potential inclusion in the MUP-based group and grouping the access terminals based on each access terminal's HARQ behavior to form a MUP-based group. The method further includes sending data to the MUP-based group using a MUP.

According to another embodiment, the invention is directed to computer-readable media storing computer-executable instructions for performing a method of selecting at least two access terminals to participate in a MUP-based communication. The method includes determining a plurality of candidate access terminals for inclusion in the MUP-based communication and grouping the candidate access terminals to form a MUP-based group, based on the HARQ behavior of the candidate access terminals. A first portion of a flow of data is sent to the MUP-based group using one or more MUPs and receiving a new HARQ response from each of the access terminals in the MUP-based group. The access terminals in the MUP-based group are regrouped based on the new HARQ responses, potentially resulting in a new group and a second portion of the flow of data is sent to the new group using one or more MUPs.

According to a further embodiment, the invention is directed to computer-readable media storing computer-executable instructions to perform a method of selecting two or more access terminals to participate in a MUP-based communication. The method includes determining a plurality of candidate access terminals that might be included in a MUP-based communication and dividing the candidate access terminals into two or more groups based on the HARQ behavior of each of the candidate access terminals. Data is sent to a first group of candidate access terminals using a MUP and sending data to a second group of candidate access terminals.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the invention is shown and designated generally as environment 100. In this environment 100, a wireless network is controlled by a base station 101. Base stations make use of various wireless technologies such as CDMA2000 compatible technologies, IEEE 802.16, and IEEE 802.11. Base station 101 provides a wireless channel that is shared among potentially numerous wireless-network-enabled access terminals, such as mobile handheld devices 102 and laptop computers 103. Base station 101 is also connected to a network 104 via a wired link 105. Numerous network resources, such as a server 106 are also connected to network 104. Thus, through the base station, wireless access terminals 102, 103 are capable of receiving requested information from servers 106 on the network 104.

Figure 2:
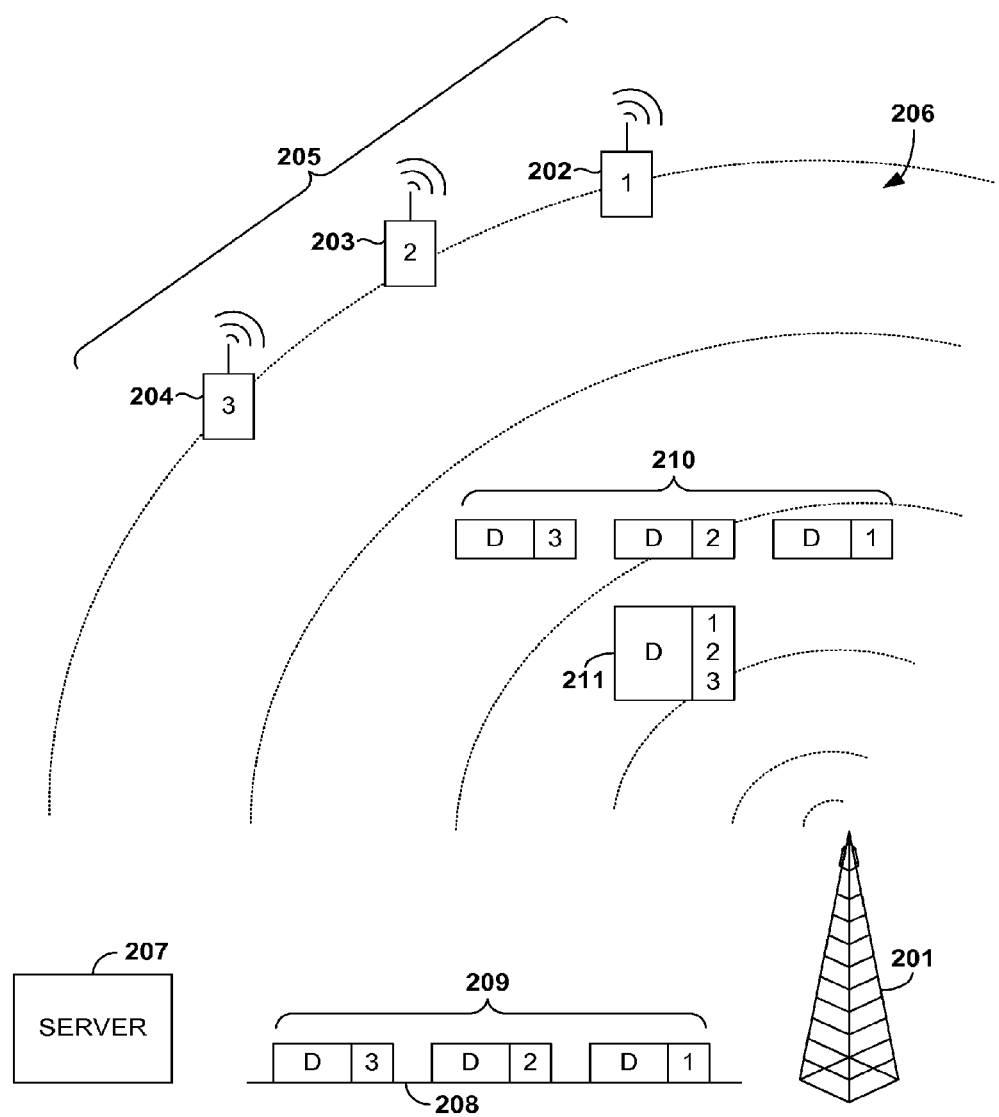
FIG. 2 depicts a block diagram of an exemplary way that multi-user packets conserve resources.

Referring now to FIG. 2, according to an embodiment of our technology, access terminals 205 request data from a server 207 connected via a wired link 208 to a base station 201 controlling the wireless channel 206 by which the access terminals are communicating. The server sends three packets 209 in response, one destined for each of the access terminals. According to one aspect of the invention, the base station forwards each of the packets 209 as three independent SUPs 210, one destined for each of the access terminals 205. According to another aspect of the invention, the base station instead sends a single MUP 211, which is accepted by each of the three access terminals 205. The MUP 211 uses one-third of the communication resources as the three independent SUPs 210, yet all three access terminals 205 receive the data in both cases. This demonstrates the benefit of using MUPs to serve multiple access terminals requesting the same information.

In one embodiment, each of the access terminals requesting data from a server that is communicated over a wireless channel has the potential to receive the data in error. One method of reporting such errors to the controlling base station so that error correction functionality can be executed is through the use of hybrid automatic repeat request (HARQ) mechanisms. By way of illustration, upon successfully receiving a packet, according to aspects of HARQ mechanisms, an access terminal can respond to the base station with an acknowledgement (ACK). According to another aspect of HARQ mechanisms, upon failing to receive a packet successfully, an access terminal can respond to the base station with a negative acknowledgement (NACK). Those skilled in the art will recognize that there are other ways to define the behavior of HARQ mechanisms. The HARQ behavior of each access terminal will affect the overall efficiency of using a MUP to send data to a group of access terminals. For a MUP to be considered successfully received, it must be received by all access terminals in the MUP-based group. According to one embodiment of the invention, if a single access terminal in a MUP-based group responds to a MUP with a NACK, then that MUP must be retransmitted. If on the retransmission of the MUP, a single access terminal in the MUP-based group responds to the MUP with a NACK, even if that access terminal successfully received the original transmission of the MUP, then the MUP must be retransmitted again. These retransmissions cause the access terminals in the MUP-based group that have successfully received the MUP to perceive a delay in receiving data following the MUP.

Figure 3:
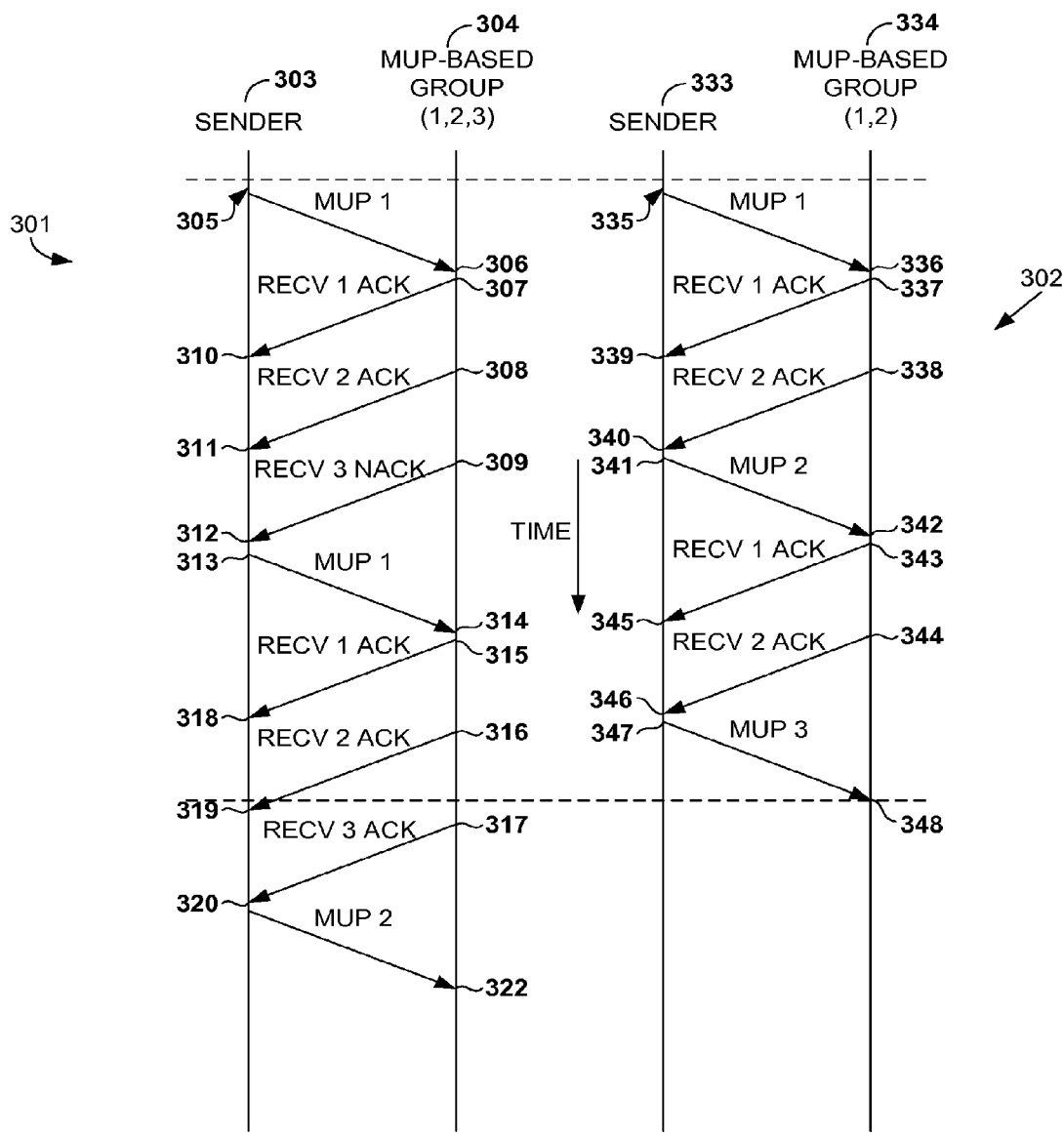
FIG. 3 is a timing diagram of exemplary communication sessions using HARQ.

By way of illustration, referring to FIG. 3, the left timing diagram 301 depicts a sender 303 transmitting MUPs to a MUP-based group 304 consisting of three access terminals. At time 305 the sender transmits the first MUP in a group of MUPs. The first MUP reaches the access terminals in the MUP-based group at time 306. ACKs are received from receiver one 307, and receiver two 308; however, receiver three has failed to successfully receive the MUP and therefore sends a NACK 309. At times 310-312 the ACKs and NACK are received by the sender. At time 313 the sender retransmits the first MUP since receiver three responded with a NACK. The retransmission of the first MUP reaches the MUP-based group at time 314. This time all of the access terminals in the MUP-based group successfully receive the MUP and send ACKs at times 315-317. The sender receives all three ACKs from the MUP-based group at times 318-320 and transmits the second MUP at time 321. The second MUP reaches the MUP-based group members at time 322.

Now, referring again to FIG. 3, consider the same scenario, but this time where the third access terminal, which failed to receive the first MUP successfully, was not a member of the MUP-based group, depicted in the right timing diagram 302. This time the sender 333 is transmitting MUPs to a MUP-based group 334 consisting of two access terminals. At time 335 the sender 333 transmits the first MUP. The first MUP arrives at each of the access terminals in the MUP-based group at time 336. Both access terminals in the MUP-based group successfully receive the MUP and respond with ACKs at times 337-338. The ACKs are received by the sender 333 at times 339 and 340. The second MUP is transmitted at time 341 and arrives at the access terminals in the MUP-based group at time 342. Again both access terminals successfully receive the MUP and transmit ACKs at times 343 and 344. The sender 333 receives the ACKs at times 345 and 346 and transmits the third MUP at time 347, which arrives at the access terminals in the MUP-based group at time 348. Once the third access point was removed from the MUP-based group, in the new group was able to receive three MUPs in less time than it took the larger group to receive two. This is mostly due to the need for the retransmission, which penalized all three access points, not only the third access point that actually required the retransmission. Those skilled in the art will recognize there are many other sequences of events that would embody the same basic behavior as that depicted in the two timing diagrams 301, 302, including sequences derived from using window-based protocols instead of stop-and-wait protocols.

Figure 4:
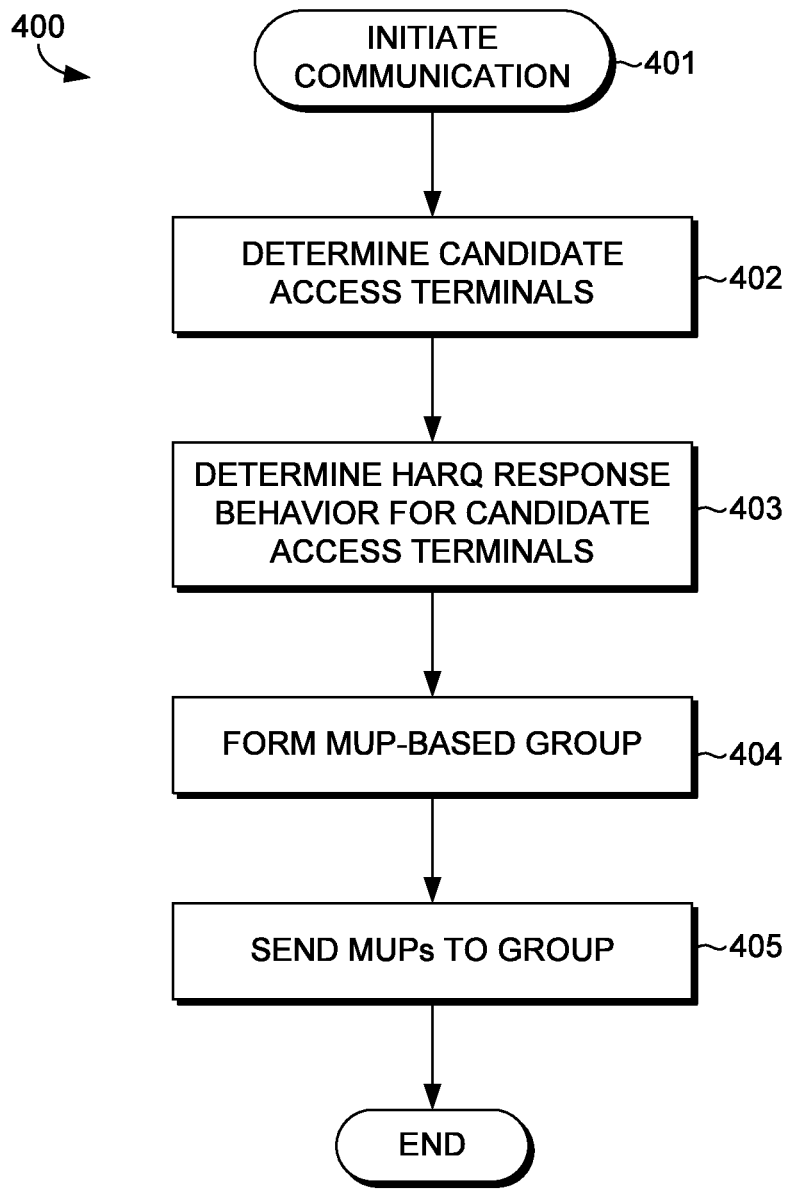
FIG. 4 is flow diagram showing a method for forming a MUP-based group of candidate access terminals.

Turning now to FIG. 4, a flow diagram is provided that illustrates a method 400 for forming a MUP-based group based on the HARQ behavior of candidate access terminals, according to one embodiment. Once a communication is initiated, shown at block 401, involving a request to send data to two or more access terminals, a set of candidate access terminals is determined, shown at block 402. Access terminals that are designated as candidates must have a collection of properties in common.

By way of illustration, requirements to be candidate access terminals could include requesting the same data, using the same packet format, and using the same data rate. According to an embodiment of the invention, a list of candidate access terminals is collected during normal communication processes by a base station controlling the wireless network. Once a list of candidate access terminals is determined, the HARQ behavior for each of the candidate terminals is determined 403, in one embodiment. By way of illustration, this behavior could be characterized by the percentage of ACKs that have been sent by the terminal over a period of time or by the signal-to-noise ratio at each of the access terminals. Those skilled in the art will recognize there are other ways in which the HARQ behavior could be characterized for the purpose of forming MUP-based groups. Given the behavior of the candidate access terminals, a MUP-based group is formed from a subset of the candidate access terminals, shown at block 404. According to an embodiment, the MUP-based group could be made up of all access terminals that responded to the last packet with an ACK. According to another embodiment, the MUP-based group could be made up of all access terminals that have responded with a threshold number of ACKs over a period of time. MUPs are sent to the MUP-based group, shown at block 405.

Figure 5:
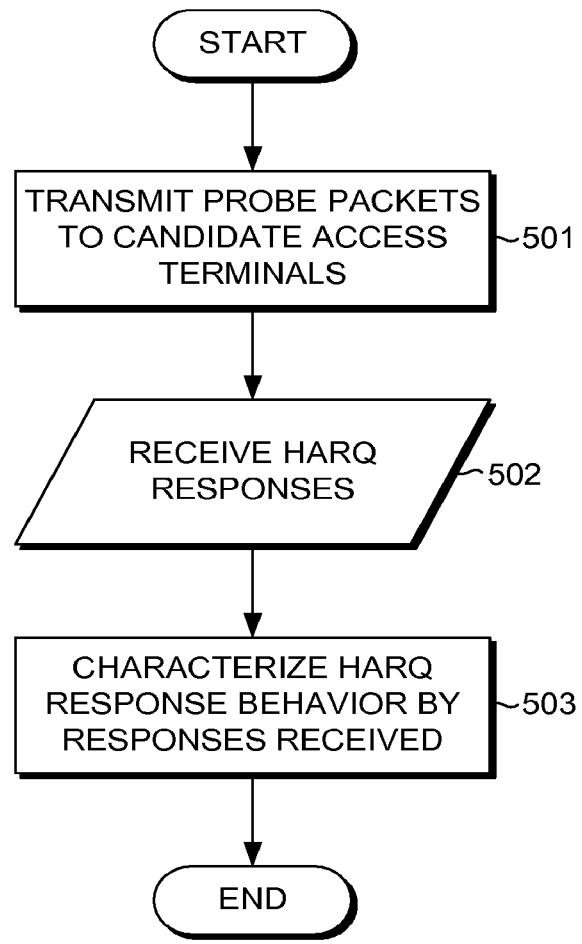
FIG. 5 is a flow diagram showing a method of determining the HARQ behavior of access terminals using probe packets.

The method of determining the HARQ behavior for candidate access terminals, as shown at block 403 of FIG. 4 is expanded in the flow diagram presented in FIG. 5, according to some embodiments. A probe packet is sent to each of the candidate access terminals, shown at block 501. Responses are received and associated with each of the candidate access terminals, shown at block 502. Each candidate access terminal is categorized based on the responses to the probe packets, shown at block 503. Those skilled in the art will recognize that there are a number of ways to categorize the candidate access terminals, including based on whether or not they respond to the probe packet with an ACK.

Figure 6:
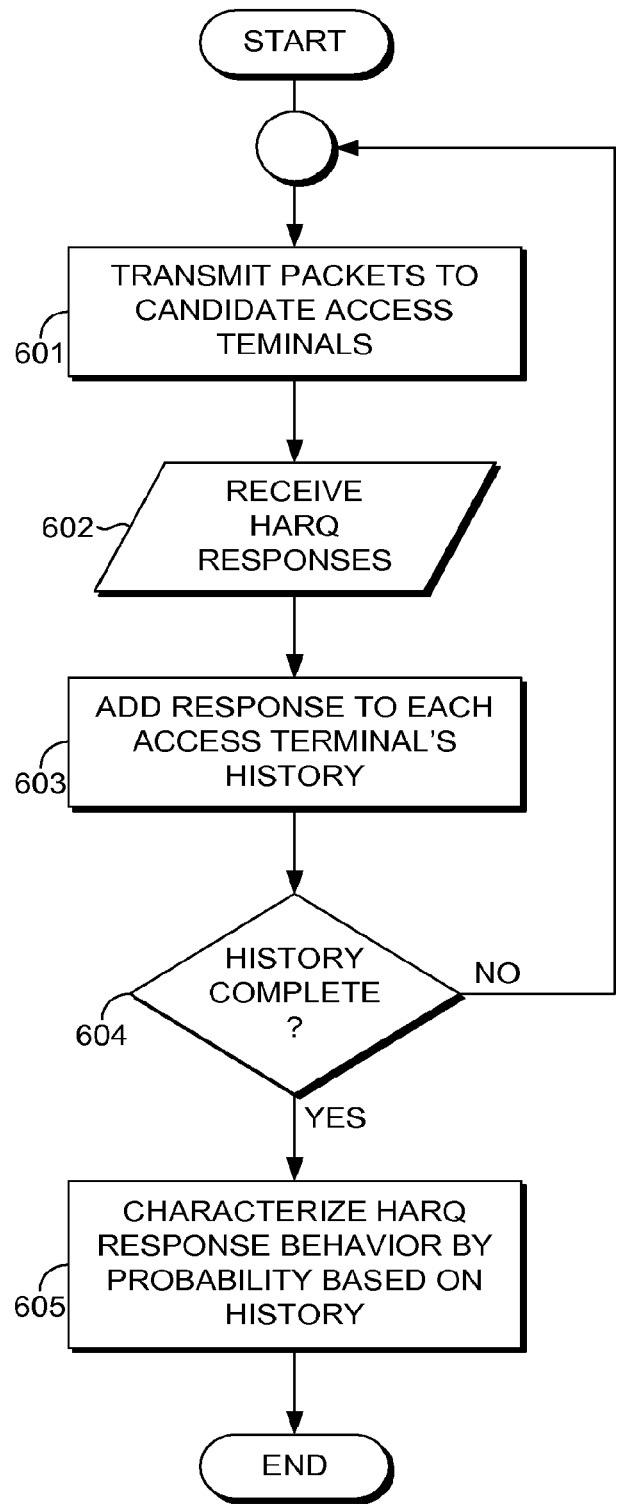
FIG. 6 is a flow diagram showing a method of determining the HARQ behavior of access terminals using candidate access terminal HARQ measures.

According to a further embodiment, the method of determining the HARQ behavior for candidate access terminals, as shown at block 403 of FIG. 4 is expanded in the flow diagram presented in FIG. 6. Packets are transmitted to each of the candidate access terminals as shown at block 601. An HARQ response is received from each of the candidate access terminals. These responses are added to each candidate access terminal's history, which can be a measure of HARQ response types (e.g., ACK and NACK), as shown at block 603. Those skilled in the art will recognize that there are many history-keeping algorithms that could be used for this purpose, including using a counter for each type of HARQ response; using a single counter for a single, predetermined type of response; and using a ratio of the number of a type of HARQ response to a total number of responses.

A decision is made as to whether or not a sufficient amount of history has been collected 604, according to an embodiment. By way of illustration, this decision could be based on a predetermined threshold of packets that have been sent and based on a preconfigured period of time. Those skilled in the art will recognize that there are other methods of determining when a sufficient history has been collected. Each candidate access terminal is categorized based on their respective histories, shown at block 605. Those skilled in the art will recognize that there are a number of ways to categorize the candidate access terminals, including based on whether or not they respond with an ACK at least a threshold amount.

Figure 7:
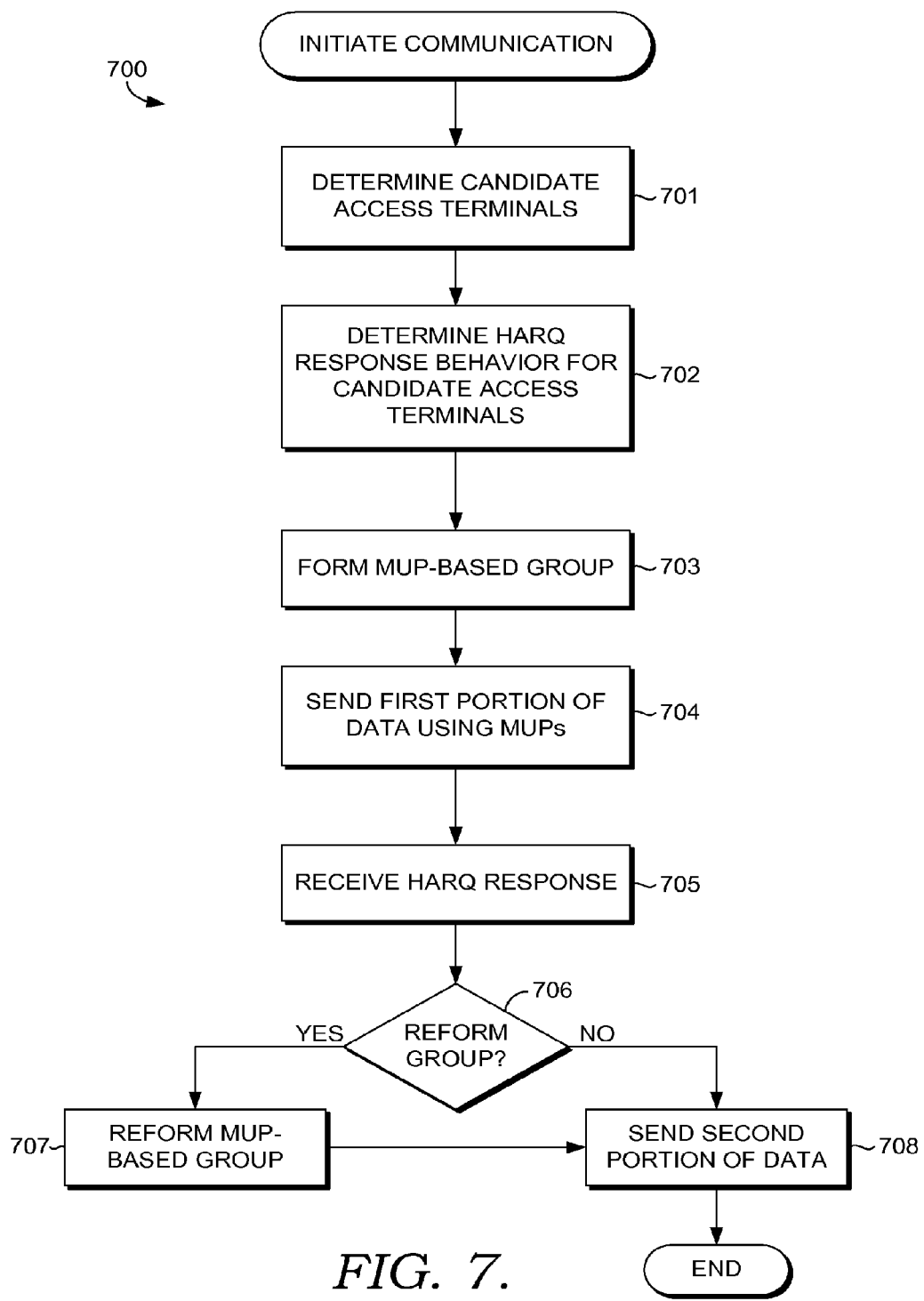
FIG. 7 is a flow diagram showing a method of reforming a MUP-based group of candidate access terminals based on new HARQ responses.

Turning now to FIG. 7, a flow diagram is provided that illustrates a method 700 for forming a MUP-based group based on the HARQ behavior of candidate access terminals and transmitting a flow of packets using MUP-based communication, according to an embodiment of the invention. A group of candidate access terminals is determined, shown at block 701, similar to the method shown at block 402 of FIG. 4. The HARQ behavior for each of the candidate access terminals is determined, shown at block 702, similar to the method used at block 403 of FIG. 4. A MUP-based group is formed based on the HARQ behavior of candidate access terminals, shown in 703, similar to the method shown at block 404 of FIG. 4 and a first portion of the data is sent using one or more MUPs, shown at block 704. Responses to the one or more MUPs are received from the MUP-based group, shown at block 705 and a decision is made, based on the responses, as to whether the group should be reformed, shown at block 706.

By way of illustration, if one or more of the MUP-based group members responded to a MUP with a NACK, then the group could be reformed. As another example, if one or more MUP-based group members' histories fell below an ACK threshold with the addition of the responses to their respective histories, the MUP-based group could be reformed. If the decision is made to reform the group, then the MUP-based group is reformed, shown at block 707, similar to the method of forming the group at block 703. A second portion of the data is sent using one or more MUPs to the newly formed MUP-based group, shown at block 708. If the decision was made to not reform the group at block 706, then a second portion of the data is sent using one or more MUPs to the original MUP-based group, shown at block 708.

Figure 8:
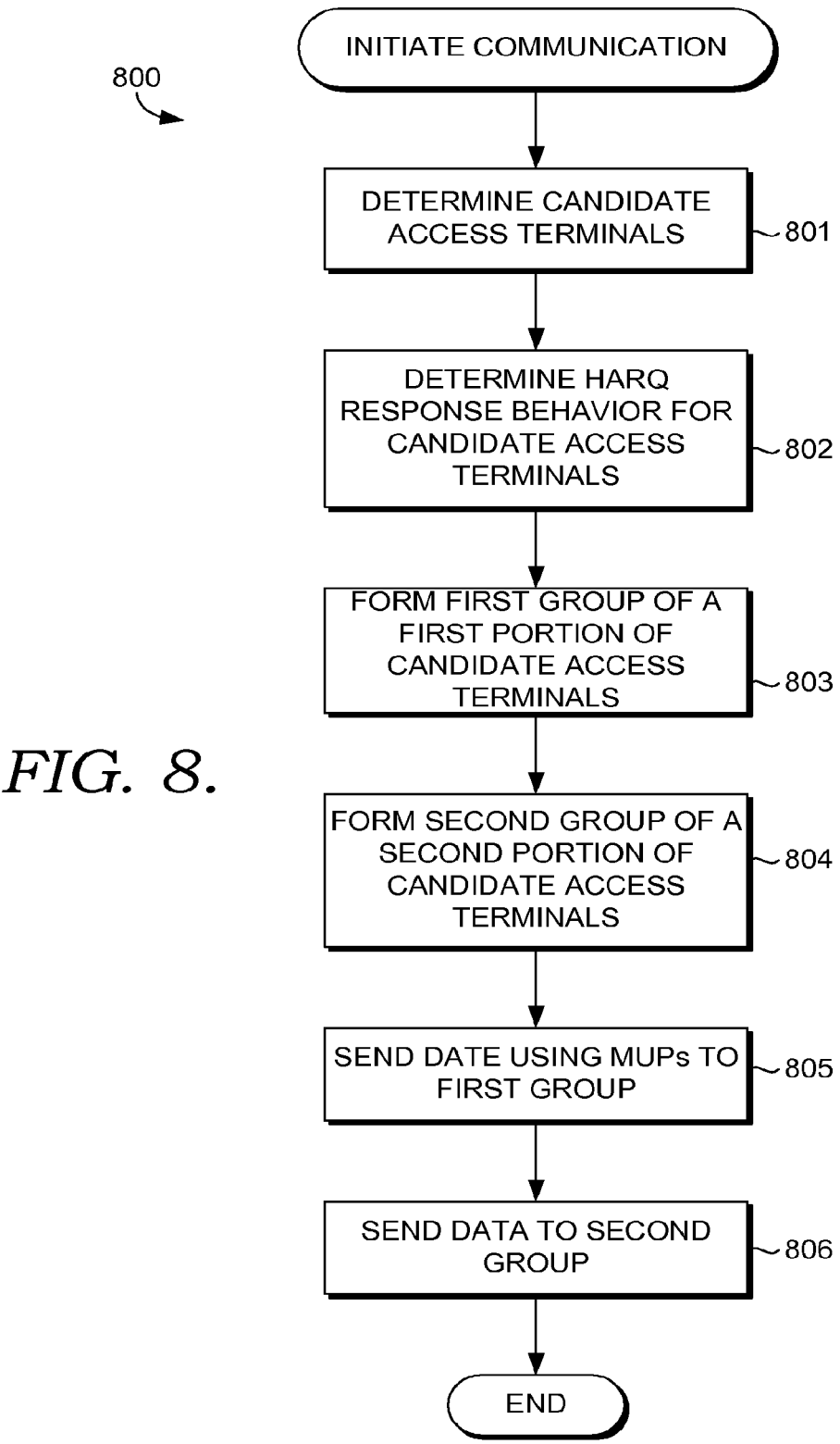
FIG. 8 is a flow diagram showing a method of forming multiple groups of candidate access terminals.

Referring to FIG. 8, a flow diagram is provided that illustrates a method 800 of sending data to MUP-based groups, according to an embodiment. A number of candidate access terminals are determined, as shown at block 801, and the HARQ behavior for each of the candidate access terminals is determined, shown at block 802. A first group is formed, based on the HARQ behavior of each of the candidate access terminals, as shown at block 803.

By way of illustration, the first group could be composed of those nodes that responded with an ACK to a probe packet as discussed previously or those nodes with an ACK history above a certain threshold. A second group is formed from one or more remaining candidate access terminals, also based on HARQ behavior, shown at block 804. By way of illustration, the second group could be composed of those nodes that respond with a NACK to a probe packet or those nodes with an ACK history below a certain threshold. Data is sent to the first group of candidate access terminals using MUPs, shown at block 805, and data is sent to the second group of candidate access terminals, shown at block 806. Those skilled in the art will recognize that data could be sent to the second group of access terminals in many of ways. By way of illustration, the data could be sent using a MUP for the group or by using SUPs for each access terminal in the group.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-readable media having computer-executable instructions embodied thereon that, when executed, facilitate a method of sending data to two or more access terminals selected to participate in a multi-user packet (MUP) based communication, the method comprising:
determining a plurality of candidate access terminals ("terminals") that might be included in said MUP-based communication;
counting a number of a type of HARQ response for each of the plurality of terminals for a period of time;
calculating a measure of HARQ response types for each of the plurality of terminals based on the number of the type of HARQ response for the terminal;
prior to grouping two or more terminals from the plurality of terminals to form a MUP-based group, comparing the measure for each of the terminals to a HARQ threshold;
grouping two or more terminals from the plurality of terminals to form a MUP-based group, wherein each terminal in the MUP-based group has a measure greater than the HARQ threshold; and
sending data to the MUP-based group using a MUP.

2. The media of claim 1, wherein the measure of HARQ response types is based on a ratio of the number of the type of HARQ response to a total number of HARQ responses.

3. The media of claim 2, wherein the type of HARQ response is an acknowledgement.

4. The media of claim 1, wherein the period of time is based on a predetermined threshold number of packets.

5. The media of claim 1, wherein the period of time id based on a preconfigured period of time.

6. One or more nontransitory computer-readable media having computer-executable instructions embodied thereon that, when executed, facilitate a method of sending data to two or more access terminals selected to participate in a multi-user packet (MUP) based communication, the method comprising:
determining a plurality of candidate access terminals ("terminals") that might be included in said MUP-based communication;
for each of the plurality of terminals, collecting a history of HARQ responses;
determining that a predetermined amount of history of HARQ responses has been collected;
grouping two or more terminals from the plurality of terminals to form a MUP-based group, wherein each of the two or more terminals is grouped based on a measure of HARQ response types in the history of HARQ responses collected for the terminal;
sending data to the MUP-based group using a MUP.

7. The media of claim 6, wherein the measure of HARQ response types is based on a count of each type of HARQ response.

8. The media of claim 6, wherein the measure of HARQ response types is based on a count of a single, predetermined type of HARQ response.

9. The media of claim 6, wherein the measure of HARQ response types is based on a ratio of a number of a type of HARQ response to a total number of HARQ responses.

10. The media of claim 8, wherein the type of HARQ response is an acknowledgement.

11. The media of claim 8, wherein the type of HARQ response is a negative acknowledgement.

12. The media of claim 6, wherein the predetermined amount of history is based on a predetermined threshold number of packets.

13. The media of claim 6, wherein the predetermined amount of history is based on a preconfigured period of time.

14. One or more nontransitory computer-readable media having computer-executable instructions embodied thereon that, when executed, facilitate a method of sending data to two or more access terminals selected to participate in a multi-user packet (MUP) based communication, the method comprising:
determining a plurality of candidate access terminals ("terminals") that might be included in said MUP-based communication;
for each of the plurality of terminals, collecting a history of HARQ responses;
determining that a predetermined amount of history of HARQ responses has been collected;

grouping two or more terminals from the plurality of terminals to form a MUP-based group, wherein each of the two or more terminals is grouped based on a measure of HARQ response types in the history of HARQ responses collected for the terminal;

sending a first portion of a data flow to the MUP-based group using one or more MUPs;

receiving new HARQ responses from the MUP-based group;

regrouping the two or more terminals in the MUP-based group based on the new HARQ responses, resulting in a new group; and sending a second portion of the data flow to the new group using one or more MUPs.

15. The media of claim 14, wherein the measure of HARQ response types is based on a count of each type of HARQ response.

16. The media of claim 14, wherein the measure of HARQ response types is based on a count of a single, predetermined type of HARQ response.

17. The media of claim 14, wherein the measure of HARQ response types is based on a ratio of a number of a type of HARQ response to a total number of HARQ responses.

18. The media of claim 16, wherein the type of HARQ response is an acknowledgement.

19. The media of claim 14, wherein the predetermined amount of history is based on a predetermined threshold number of packets.

20. The media of claim 14, wherein the predetermined amount of history is based on a preconfigured period of time.

* * * * *